(12) United States Patent
Theilen

(10) Patent No.: US 7,419,107 B1
(45) Date of Patent: Sep. 2, 2008

(54) SWIVEL INLET HOSE-DRAG LINEAR IRRIGATION MACHINE

(76) Inventor: Dennis R. Theilen, 2015 S. 193rd St., Omaha, NE (US) 68130

( * ) Notice: Subject to any disclaimer, the term of this patent is extended or adjusted under 35 U.S.C. 154(b) by 0 days.

(21) Appl. No.: 11/827,328

(22) Filed: Jul. 11, 2007

Related U.S. Application Data

(60) Provisional application No. 60/831,474, filed on Jul. 18, 2006.

(51) Int. Cl.
*B05B 3/18* (2006.01)
*B05B 3/00* (2006.01)

(52) U.S. Cl. ............. 239/741; 239/723; 239/587.5

(58) Field of Classification Search ........ 239/722–724, 239/726, 735, 740, 741, 587.5, 588
See application file for complete search history.

(56) References Cited

U.S. PATENT DOCUMENTS 3,929,197 A * 12/1975 Malott et al. ............ 180/335
4,172,551 A 10/1979 Johnson
5,080,290 A * 1/1992 Ostrom ................... 239/724
5,356,080 A * 10/1994 Chapman ................. 239/724
6,068,197 A * 5/2000 Tolson ....................... 239/1
7,140,563 B2 * 11/2006 Sinden et al. ............ 239/722
2006/0283507 A1 12/2006 Marcy

* cited by examiner

*Primary Examiner*—Darren W Gorman
(74) *Attorney, Agent, or Firm*—Thomte Patent Law Office; Dennis L. Thomte

(57) ABSTRACT

A swivel inlet hose-drag irrigation machine is disclosed which utilizes an inlet elbow mounted in a swivel bearing on the cart to attach a water supply hose to the machine. The inlet elbow is mounted to the side of the four-wheel linear cart rather than behind the cart between the tires. The inlet elbow is free to rotate in a 180° arc so that the hose can be attached from either end of the cart at the side thereof. The machine also includes a pair of vertically disposed and rotatable rollers which are mounted at the opposite ends of the cart to push the drag hose out of the way of the tires of the cart so that the tires of the cart do not roll over the drag hose thereby eliminating any manual handling of the drag hose.

9 Claims, 6 Drawing Sheets

SWIVEL INLET HOSE-DRAG LINEAR IRRIGATION MACHINE

CROSS-REFERENCE TO RELATED APPLICATION

This application claims the benefit of U.S. Provisional Application Ser. No. 60/831,474 entitled SWIVEL INLET HOSE-DRAG LINEAR IRRIGATION MACHINE filed Jul. 18, 2006, the disclosure of which is hereby incorporated herein by reference.

BACKGROUND OF THE INVENTION

1. Field of the Invention

This invention relates to a linear move irrigation system and more particularly to a swivel inlet hose-drag linear irrigation machine.

2. Description of the Related Art

FIGS. 1 and 2 illustrate a prior art linear move irrigation machine or system, such as disclosed in U.S. Pat. No. 4,172,551. As seen in FIGS. 1 and 2, the prior art machine generally comprises an elongated water conduit which extends over the field to be irrigated and which is supported by a series of support towers spaced along the length thereof. Each of the support towers is self-propelled so that the conduit may be moved across the field to be irrigated. The linear move irrigation system such as disclosed in the '551 patent normally obtains water therefore from a canal or ditch which extends along one side of the field. The machine of the '551 patent is normally referred to as a ditch-feed linear with the water being drawn out of the ditch by suction. An engine driven pump is mounted on the machine and a suction inlet screen is mounted on the end of a pipe that extends down into the ditch. Another type of linear irrigation machine is what is referred to as a hose-drag linear irrigation machine. FIG. 3 illustrates a prior art hose-drag linear machine such as disclosed in Patent Application Publication US2006/0283507A1 published on Dec. 21, 2006. Hose-drag linear machines are supplied water through a length of polyethylene hose that drags behind the machine. The length of the polyethylene hose may vary depending on field characteristics and hose diameter, but is generally from 400 feet to 1,000 feet.

Hose-drag linear machines that pull large lengths of hose generally have four wheels and two motors (electric) to provide the traction and power required. The hose is typically attached to the machine at the rear of the cart, centered between the wheels. When the machine is reversed to travel in the other direction, the hose must be disconnected from the machine, dragged to the side (out of the machine's path), and dragged around in a loop to reconnect to the other end of the hose-drag cart. This is time-consuming and labor intensive and is a main reason that hose-drag linear machines are not used by more customers. In some cases, two-wheel hose drag units have been utilized, but the hose pull capability of those carts is limited due to the light weight thereof and the lack of traction thereof.

SUMMARY OF THE INVENTION

The swivel inlet hose-drag irrigation machine of this invention uses an inlet elbow mounted in a swivel bearing to attach the water supply hose to the machine. The inlet elbow is mounted out to the side of the four-wheel linear cart rather than behind the cart between the tires. The inlet elbow is free to rotate in an approximate 180° arc so that the hose can be attached from either end of the cart at the side thereof. In this way, the hose never needs to be disconnected from the cart because the elbow can simply be rotated around to face the opposite direction. An attractive feature is for the elbow to automatically swivel to the other side as the machine reverses, so the operator need not be present. This is accomplished by biasing the elbow outward away from the cart at a small angle so that when the machine is reversed and begins to push the polyethylene hose backwards, there will be a small component of force causing the elbow to rotate. The polyethylene hose has weight and stiffness enough to push the elbow around. As the machine reverses, the polyethylene hose is pushed outwardly away from the cart, the elbow rotates as necessary, and the polyethylene hose eventually trails behind the inlet elbow as the machine continues down its path in the opposite direction. The instant invention also includes means for pushing the drag hose out of the way of the tires of the machine.

It is therefore a principal object of the invention to provide a swivel inlet hose-drag linear irrigation machine.

A further object of the invention is to provide a machine of the type described which is much easier to operate than conventional hose-drag linear irrigation machines.

Yet another object of the invention is to provide a machine of the type described wherein in fields with only one water supply hydrant in the center of the field, the polyethylene hose need never be disconnected from either the hydrant or the linear irrigation machine.

Yet another object of the invention is to provide a machine of the type described that is almost as labor-free as a center pivot irrigation system.

These and other objects will be apparent to those skilled in the art.

DETAILED DESCRIPTION OF THE INVENTION

Figure 3:
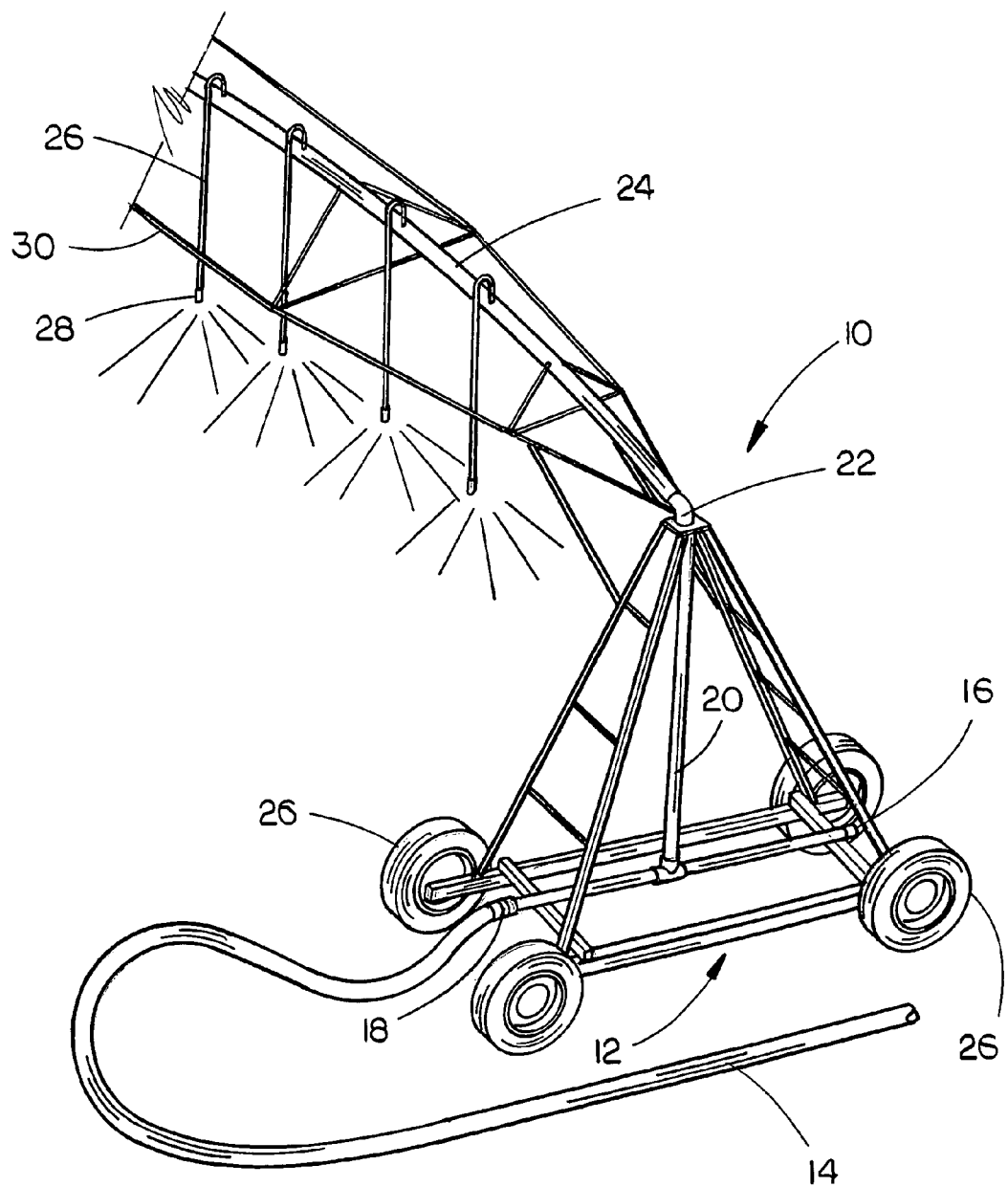
FIG. 3 is a partial perspective view of a prior art linear irrigation system or machine.
Figure 4:
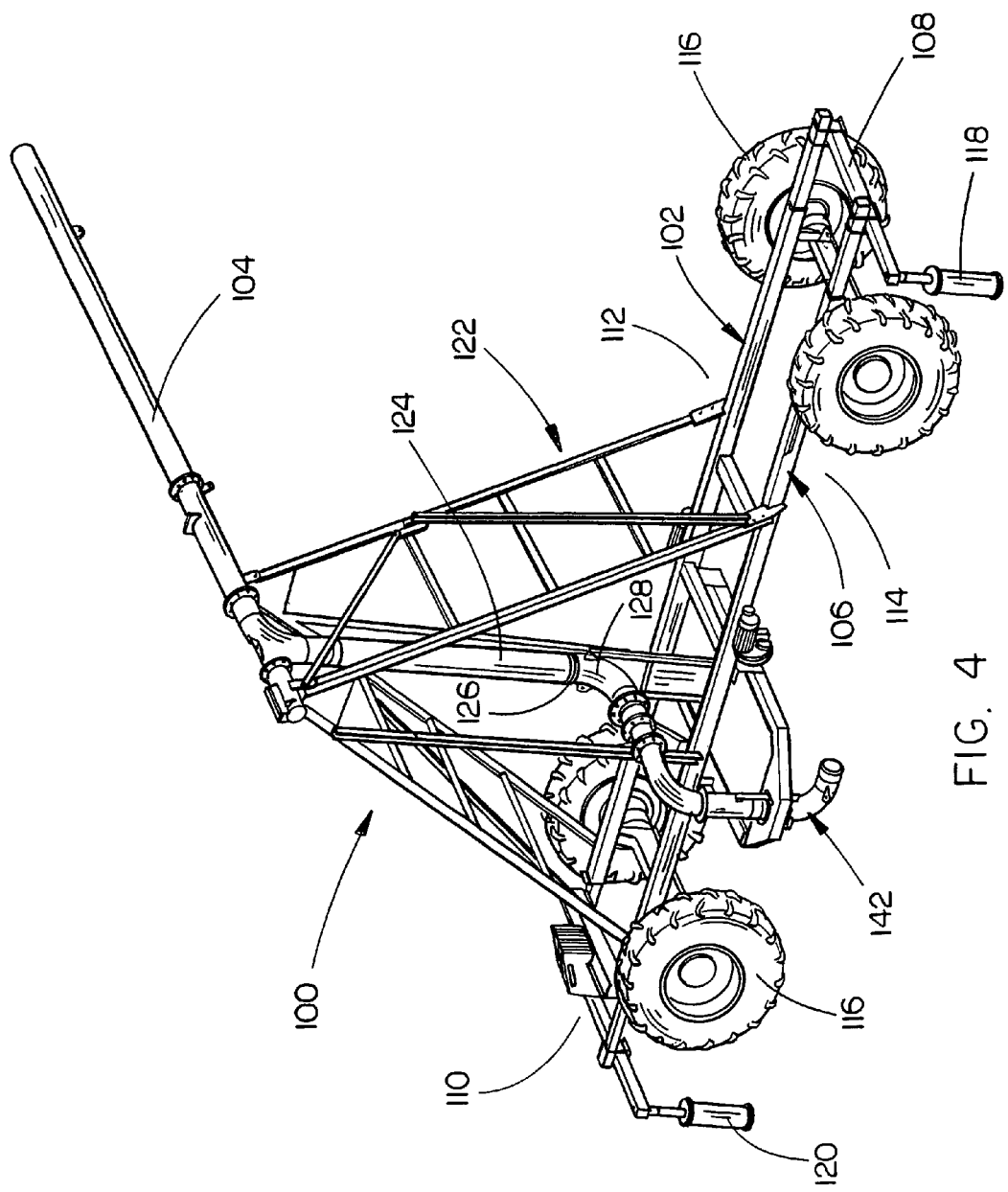
FIG. 4 is a partial perspective view of the hose-drag linear irrigation machine of this invention.
Figure 5:
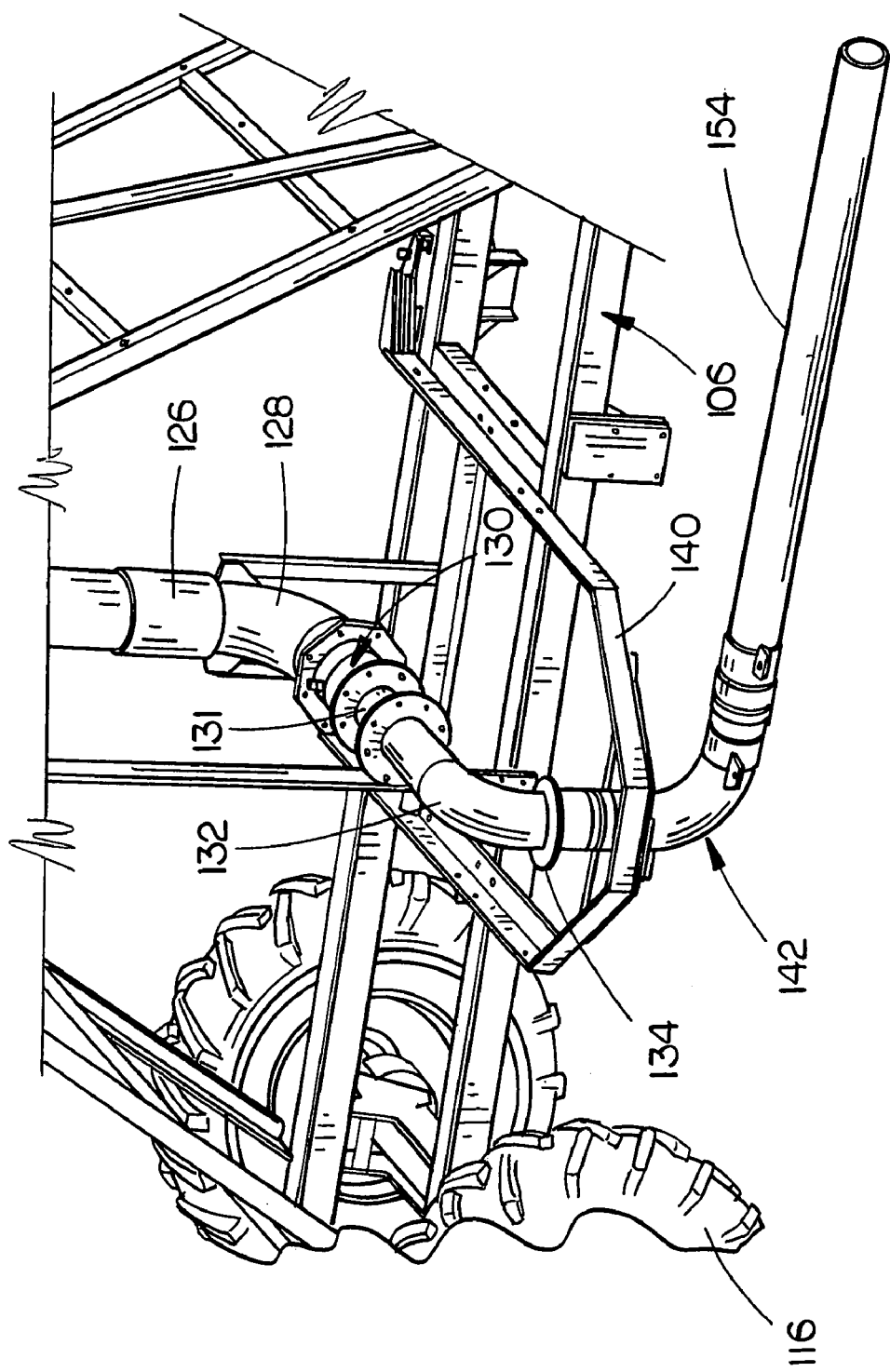
FIG. 5 is a partial perspective view of the machine of FIG. 4.

Referring to FIG. 3 wherein a prior art hose-drag linear irrigation machine or system 10 is shown, the numeral 12 refers to a four-wheel cart which normally has a platform on which an engine, generator or oil pump and various panels are mounted, but the platform and items mounted thereon are not shown for reasons of clarity. Water from a conventional hydrant enters hose 14, which is connected to cart 12 at either point 16 or 18. The water then flows up vertical feed pipe 20 to an elbow connection 22, thence out into a main water line 24 which is supported upon a plurality of spaced-apart self-propelled drive towers or units in conventional fashion. The water flows through drops 26 to spray nozzles 28 where it is sprayed onto crops. The drops 26 and nozzles 28 are frequently replaced with other spray devices positioned on water line 24. The main water line 24 is supported by a truss structure 30. Cart 12 includes wheels 26, some of which or all of which are driven for propelling the cart 12 down the field, dragging one end of hose 14 along with it. When cart 12 reaches the limit of its travel away from the hydrant, the hose 14 must be disconnected from point 18 and connected to point 16 or vice versa.

Figure 1:
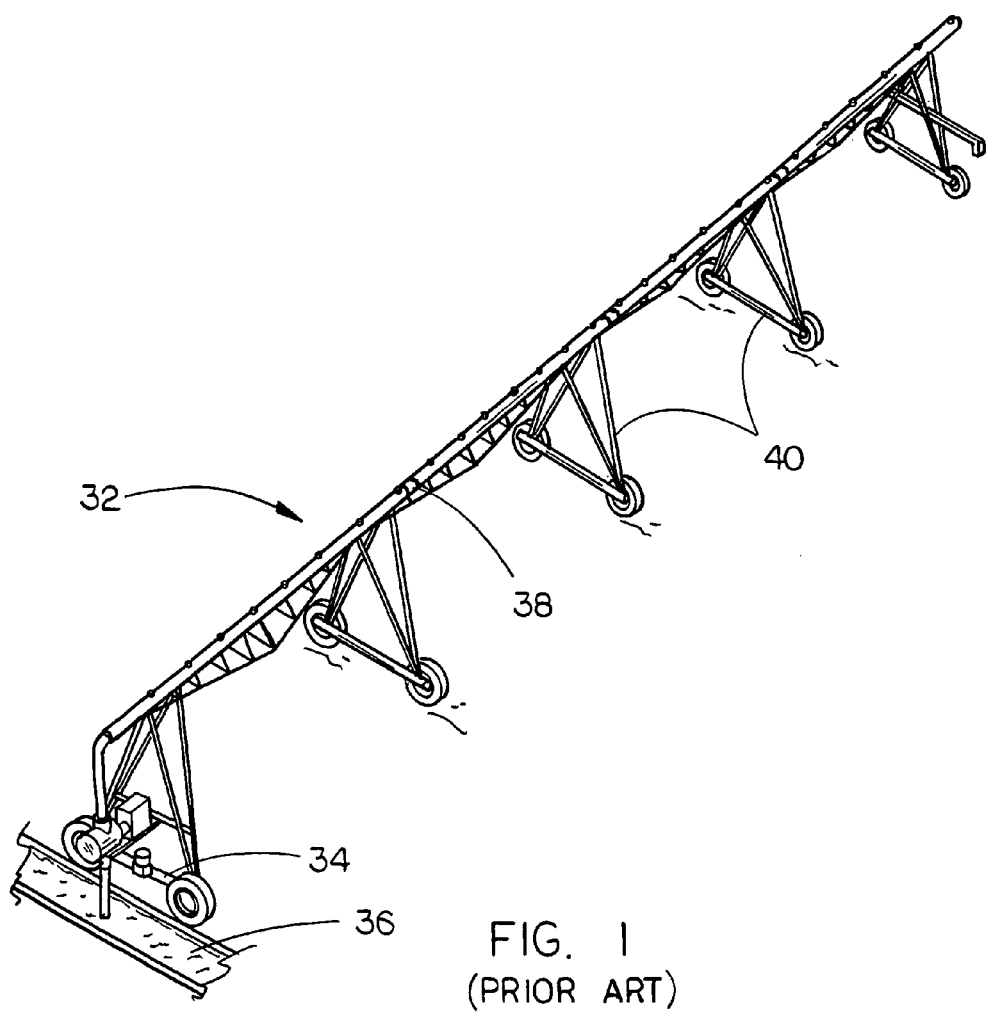
FIG. 1 is a perspective view of a prior art linear irrigation system of the ditch feed type.
Figure 2:
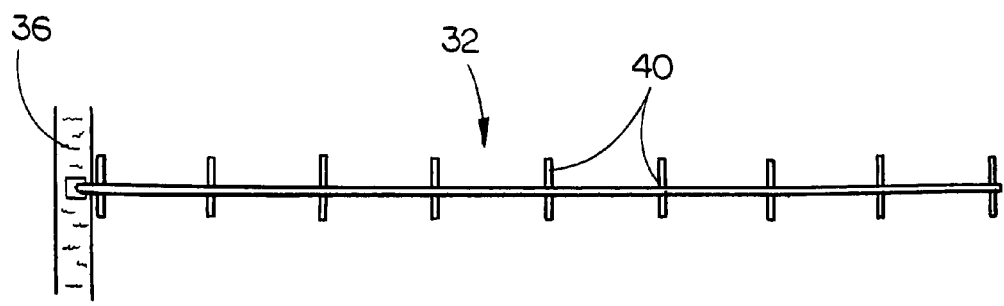
FIG. 2 is a top view of a prior art linear irrigation system of the ditch feed type.

FIGS. 1 and 2 illustrate another type of prior art linear irrigation machine which is of the ditch feed type and which is referred to generally by the reference numeral 32. The drive cart 34 receives its water supply from a ditch 36 to supply water to the main water line 38 which is supported upon a plurality of spaced-apart self-propelled drive towers or units 40.

In FIGS. 4-9, the reference numeral 100 refers generally to the swivel inlet hose-drag linear irrigation machine of this invention with the numeral 102 referring to the four-wheel linear cart which supports one end of the main water line 104 which is supported upon a plurality of conventional self-propelled drive towers or units such as illustrated in FIGS. 1 and 2. Cart 102 includes a wheeled frame means 106 having ends 108 and 110, an inner side 112 and an outer side 114. Frame means 106 includes four wheels 116, some or all of which are driven either forwardly or rearwardly in conventional fashion. Cart 102 also includes a pair of rollers 118 and 120 which are horizontally and vertically adjustably positioned at outer side 14 of frame means 106. Rollers 118 and 120 are each rotatable about vertical axes.

Figure 8:
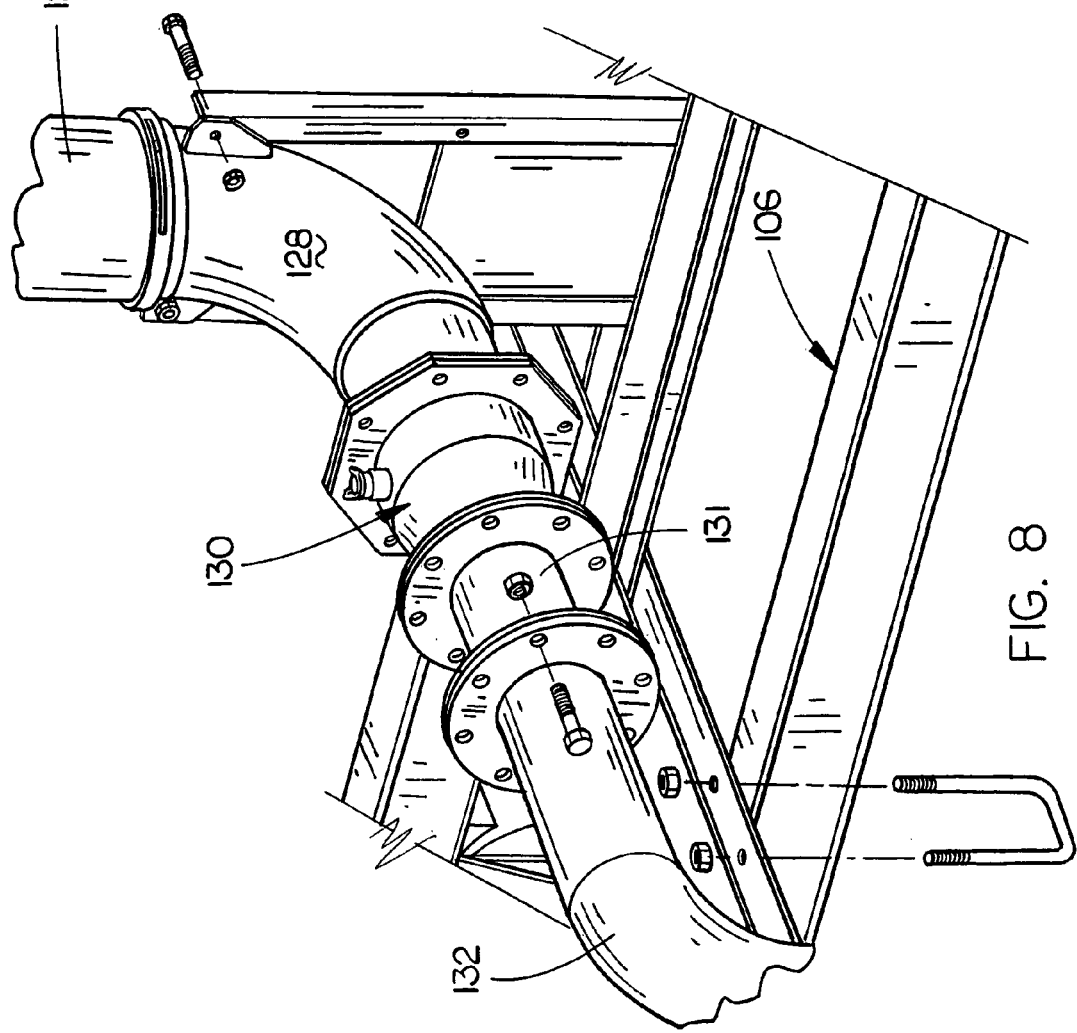
FIG. 8 is a perspective view illustrating the manner in which the swivel inlet elbow is connected to the riser.

Tower structure 122 extends upwardly from frame means 106 which supports a riser pipe 124 having upper and lower ends. The upper end of riser pipe 124 is operatively connected to the inner end of the main water line 104 in conventional fashion. The upper end of a flexible boot 126 is secured to the lower end of riser pipe 124 and has its lower end secured to one end of an inlet elbow 128. A reducer assembly 130 is secured to the lower end of elbow 128 and has a 6-inch pipe 131 secured thereto, as seen in FIG. 8. The upper end of an elbow 132 is secured to the outer end of pipe 131, as seen in FIG. 8. Elbow 132 extends outwardly from pipe 131 thence downwardly therefrom. The lower end of elbow 132 has a flange 134 secured thereto which is secured to flange 136 which is secured to the upper end of a pipe 138 which extends downwardly therefrom to a swivel inlet frame 140 which is secured to frame means 106 and which extends laterally outwardly therefrom at side 114.

The upper end of swivel inlet elbow 142 is swivably connected to the lower end of pipe 138 to permit swivel inlet elbow 142 to rotate or swivel with respect to pipe 138 about a vertical axis. A pair of radially spaced-apart swivel stop brackets 144 are provided to adjustably limit the rotatable movement of swivel inner elbow 142 forwardly and rearwardly with respect to pipe 138. Thus, swivel inlet elbow 142 may swivel or rotate slightly less than 180° with respect to cart 102 so that the lower end thereof either extends towards end 108 or towards end 110 or any position therebetween. The swivel stop brackets 144 bias the elbow 142 slightly outwardly away from the cart at a small angle so that when the machine is reversed and begins to push the drag hose backwards, there will be a small component of force causing the elbow 142 to rotate. The outer lower end of swivel inlet elbow 142 is provided with a pair of spaced-apart ears 146 and 148 having openings 150 and 152 formed therein respectively.

Figure 6:
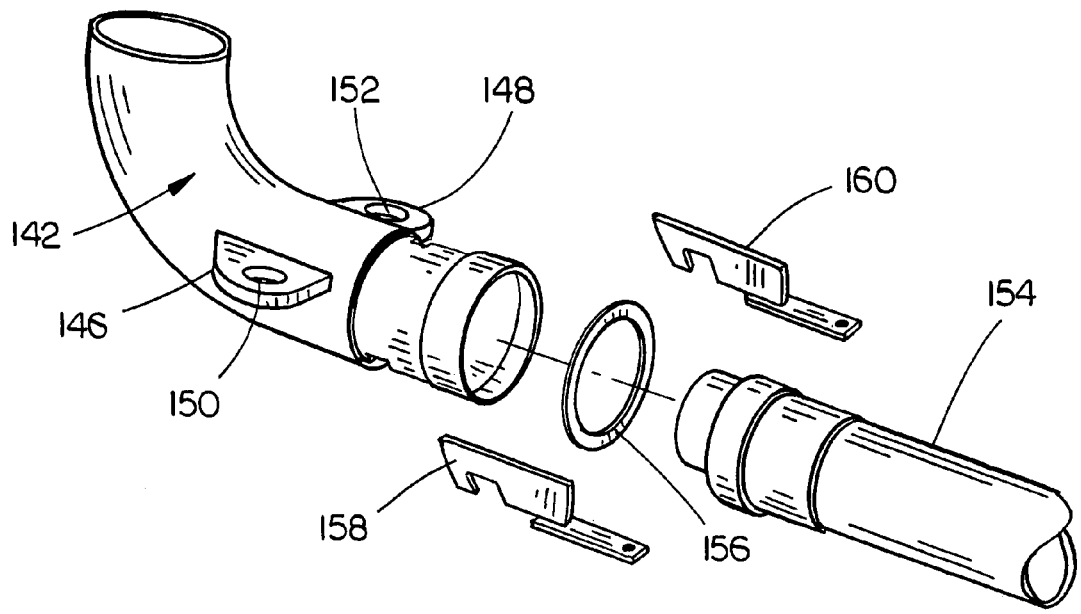
FIG. 6 is an exploded perspective view illustrating the manner in which a 6-inch polyethylene pipe end is connected to the 6-inch inlet elbow.

The inner end of the polyethylene drag hose 154 may be removably secured to the lower outer end of swivel inlet elbow 142 in different ways. FIG. 6 illustrates a 6-inch drag hose 154 having its inner end receivable within swivel inlet elbow 142 with a gasket 156 positioned therebetween. Hooks 158 and 160 are secured to hose 154 and ears 146 and 148 as illustrated to prevent the separating of hose 154 with respect to swivel inlet elbow 142.

Figure 7:
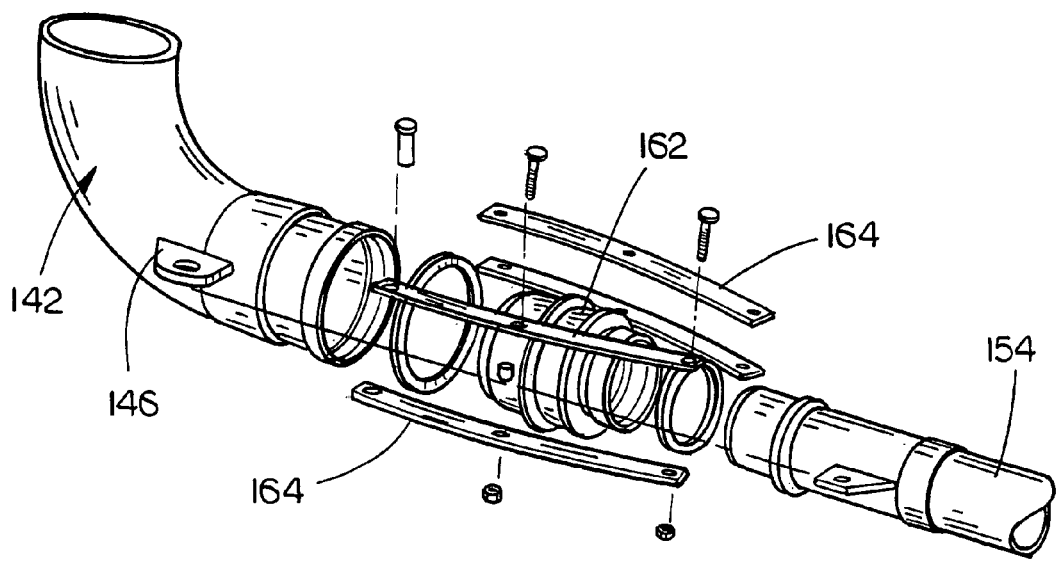
FIG. 7 is an exploded perspective view illustrating the manner in which a 4-inch polyethylene pipe end is secured to the 6-inch inlet elbow.
Figure 9:
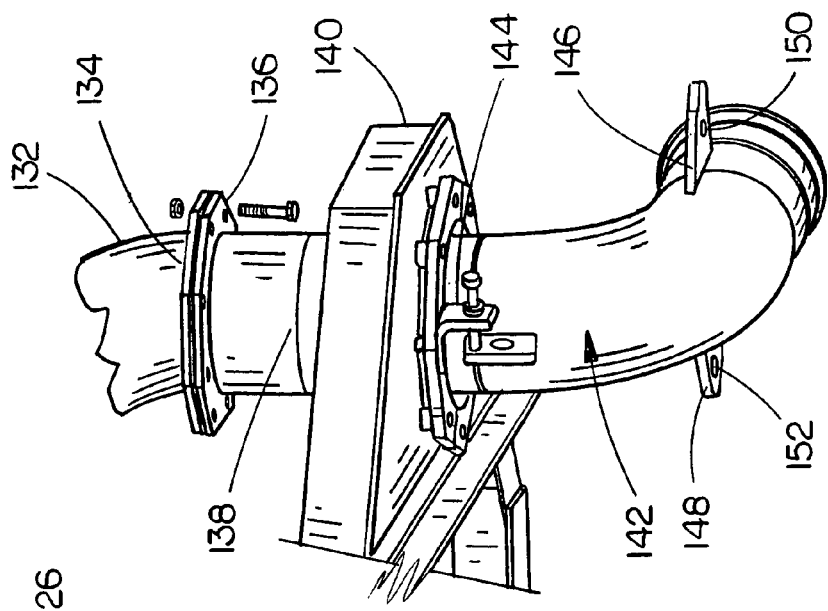
FIG. 9 is a perspective view illustrating the swivel connection between the swivel inlet elbow and the swivel inlet frame.

In FIG. 7, a 4-inch to 6-inch adapter 162 is positioned between the 4-inch end of hose 154 and the 6-inch swivel inlet elbow 142. Straps 164 are secured to and extend between the inner end of hose 154 and ears 146 and 148 as seen therein to maintain the connection of hose 154 to elbow 142.

The swivel inlet hose-drag linear irrigation machine of this invention utilizes the swivel inlet elbow 142 mounted in a swivel bearing to attach the water supply hose 154 to the machine 100. As seen in the drawings, the inlet elbow 142 is mounted out to the side of the linear cart 102 rather than behind the cart between the tires. The inlet elbow 142 is free to rotate in slightly less than a 180° arc so that the hose 154 can be attached from either end of the cart 102 at the outer side thereof. In this way, the hose 154 never needs to be disconnected from the cart 102 because the elbow 142 can simply be rotated around to face the opposite direction. An important feature of the invention is that the elbow 142 will automatically swivel to the other end as the machine reverses, so the operator need not be present. The automatic swiveling feature is accomplished by biasing the elbow 142 outwardly away from the cart 102 at a small angle so that when the machine is reversed and begins to push the hose 154 backwards, there will be a small component of force causing the elbow 142 to rotate as described above. The hose 154 has weight and stiffness enough to push the elbow 142 around for the automatic reversing operation. As the machine reverses, the hose 154 is pushed outwardly away from the cart 102 and the elbow 142 will rotate as necessary with the hose 154 eventually trailing behind the inlet elbow 142 as the machine continues its path in the opposite direction.

To ensure that the hose 154 will not come into contact with the tires 116 of the cart 102, the rollers 118 and 120 are adjustably secured to the opposite ends of the frame 110 of the cart 102. The rollers 118 and 120 also serve to push the hose 154 away from the cart's path so that the tires 116 of the cart 102 do not run over the hose 154 thereby totally eliminating any manual hose handling.

Thus it can be seen that the invention accomplishes at least all of its stated objectives.

I claim:

1. A swivel inlet hose-drag cart for a linear irrigation system including a main water line, having first and second ends, supported upon a plurality of spaced-apart drive units, comprising:

a wheeled frame means having first and second ends, an inner side and an outer side;

a support structure on said frame means having lower and upper ends;

the first end of the main water line being supported upon the upper end of said support structure:

an upstanding riser pipe, having upper and lower ends, on said frame means;

said upper end of said riser pipe being fluidly connected to the inner end of said main water line;

a first tubular elbow having an upper end portion with an upper end and a lower end portion with an outer end;

said lower end portion of said first tubular elbow extending laterally from said upper end portion of said first tubular elbow so as to extend towards said outer side of said wheeled frame means;

a second tubular elbow having an upper end portion with an inner end and a lower end portion with a lower end;

said upper end portion of said second tubular elbow being generally parallel to said lower end portion of said first tubular elbow and being fluidly connected thereto;

said lower end portion of said second tubular elbow extending downwardly from said upper end portion of said second tubular elbow;

a swivel connector secured to said lower end of said lower end portion of said second tubular elbow;

a tubular swivel inlet elbow having an upper end portion with an upper end and a lower end portion with an outer end;

said upper end of said swivel inlet elbow being connected to said swivel connector whereby said swivel inlet elbow may rotate or swivel with respect to said second tubular elbow from a first position wherein said lower end portion thereof extends generally towards said first end of said wheeled frame means outwardly of said outer side thereof to a second position wherein said lower end portion thereof extends generally towards said second end of said wheeled frame means outwardly of said outer side thereof;

said outer end of said lower end portion of said swivel inlet elbow adapted to have one end of a drag hose connected thereto.

2. The structure of claim 1 wherein first and second wheels are rotatably secured to said wheeled frame means at said outer side thereof and wherein third and fourth wheels are rotatably secured to said wheeled frame means at said inner side thereof and wherein said swivel inlet elbow is positioned laterally outwardly of said first and second wheels.

3. The structure of claim 1 wherein said lower end portion of said swivel inlet elbow may rotate or swivel less than 180° so that said lower end portion of said swivel inlet elbow is biased slightly outwardly away from said frame means in both of its said first and second positions.

4. The structure of claim 2 wherein said outer side of said cart has a first vertically disposed rotatable roller at its said first end and a second vertically disposed rotatable roller at its said second end for preventing said wheels of said cart from rolling over said drag hose thereby eliminating any manual handling of said drag hose.

5. The structure of claim 3 wherein the rotation of said swivel inlet elbow is limited by a pair of radially spaced-apart swivel stop brackets operatively connected to said second tubular elbow.

6. A hose-drag linear irrigation machine, comprising:

a main water pipe, having inner and outer ends, supported upon a plurality of spaced-apart, self-propelled drive units which propel the main water pipe over a field to be irrigated;

a self-propelled wheeled cart at said inner end of said main water pipe which supports and propels said inner end of said main water pipe in a linear fashion;

said cart having first and second ends, an inner side and an outer side;

said cart including a riser pipe having upper and lower ends;

said upper end of said riser pipe being operatively fluidly connected to said inner end of said main water pipe;

and a swivel inlet elbow assembly, having inlet and outlet ends, operatively fluidly connected to said lower end of said riser pipe which has its inlet end positioned laterally outwardly of said outer side of said cart; and a drag hose having one end operatively fluidly connected to a source of irrigating water and a second end operatively fluidly connected to said inlet end of said swivel inlet elbow assembly whereby water is able to flow from the source of irrigating water, through said swivel inlet elbow assembly, through said riser pipe and into said main water pipe for application to the field said swivel inlet assembly being pivotally movable about a vertical axis so that said inlet end thereof may extend towards either end of said cart at said outer side.

7. A hose-drag linear irrigation machine, comprising:

a main water pipe, having inner and outer ends, supported upon a plurality of spaced-apart, self-propelled drive units which propel the main water pipe over a field to be irrigated;

a self-propelled wheeled cart at said inner end of said main water pipe which supports and propels said inner end of said main water pipe in a linear fashion;

said cart having first and second ends, an inner side and an outer side;

said cart including a riser pipe having upper and lower ends;

said upper end of said riser pipe being operatively fluidly connected to said inner end of said main water pipe;

and a swivel inlet elbow assembly, having inlet and outlet ends, operatively fluidly connected to said lower end of said riser pipe which has its inlet end positioned laterally outwardly of said outer side of said cart; and a drag hose having one end operatively fluidly connected to a source of irrigating water and a second end operatively fluidly connected to said inlet end of said swivel inlet elbow assembly whereby water is able to flow from the source of irrigating water, through said swivel inlet elbow assembly, through said riser pipe and into said main water pipe for application to the field said swivel inlet assembly being movable in approximately a 180° arc so that said drag hose may be connected thereto from either end of said cart at said outer side.

8. A hose-drag linear irrigation machine, comprising:

a main water pipe, having inner and outer ends, supported upon a plurality of spaced-apart, self-propelled drive units which propel the main water pipe over a field to be irrigated;

a self-propelled wheeled cart at said inner end of said main water pipe which supports and propels said inner end of said main water pipe in a linear fashion;

said cart having first and second ends, an inner side and an outer side;

said cart including a riser pipe having upper and lower ends;

said upper end of said riser pipe being operatively fluidly connected to said inner end of said main water pipe;

and a swivel inlet elbow assembly, having inlet and outlet ends, operatively fluidly connected to said lower end of said riser pipe which has its inlet end positioned laterally outwardly of said outer side of said cart; and a drag hose having one end operatively fluidly connected to a source of irrigating water and a second end operatively fluidly connected to said inlet end of said swivel inlet elbow assembly whereby water is able to flow from the source of irrigating water, through said swivel inlet elbow assembly, through said riser pipe and into said main water pipe for application to the field said swivel inlet assembly being movable between first and second positions and wherein said swivel inlet assembly may rotate or swivel less than 180° so that said inlet end thereof is biased slightly outwardly from said cart in both of its said first and second positions.

9. A hose-drag linear irrigation machine, comprising:

a main water pipe, having inner and outer ends, supported upon a plurality of spaced-apart, self-propelled drive units which propel the main water pipe over a field to be irrigated;

a self-propelled wheeled cart at said inner end of said main water pipe which supports and propels said inner end of said main water pipe in a linear fashion;

said cart having first and second ends, an inner side and an outer side;

said cart including a riser pipe having upper and lower ends;

said upper end of said riser pipe being operatively fluidly connected to said inner end of said main water pipe;

and a swivel inlet elbow assembly, having inlet and outlet ends, operatively fluidly connected to said lower end of said riser pipe which has its inlet end positioned laterally outwardly of said outer side of said cart; and a drag hose having one end operatively fluidly connected to a source of irrigating water and a second end operatively fluidly connected to said inlet end of said swivel inlet elbow assembly whereby water is able to flow from the source of irrigating water, through said swivel inlet elbow assembly, through said riser pipe and into said main water pipe for application to the field said outer side of said cart having a first vertically disposed rotatable roller at its said first end and a second vertically disposed rotatable roller at its said second end for preventing the wheels of the cart from rolling over the drag hose.

* * * * *